(12) United States Patent
Igelka et al.

(10) Patent No.: US 9,306,957 B2
(45) Date of Patent: Apr. 5, 2016

(54) PROACTIVE SECURITY SYSTEM FOR DISTRIBUTED COMPUTER NETWORKS

(71) Applicants: Or Igelka, Ramat Gan (IL); Eyal Sinai, Kfar Saba (IL)

(72) Inventors: Or Igelka, Ramat Gan (IL); Eyal Sinai, Kfar Saba (IL)

(73) Assignee: SAP SE, Walldorf (DE)

( * ) Notice: Subject to any disclaimer, the term of this patent is extended or adjusted under 35 U.S.C. 154(b) by 61 days.

(21) Appl. No.: 13/918,274

(22) Filed: Jun. 14, 2013

(65) Prior Publication Data
US 2014/0373136 A1 Dec. 18, 2014

(51) Int. Cl.
*H04L 29/06* (2006.01)
*H04L 12/46* (2006.01)

(52) U.S. Cl.
CPC ........ *H04L 63/1408* (2013.01); *H04L 63/1425* (2013.01); *H04L 63/1441* (2013.01); *H04L 12/4633* (2013.01)

(58) Field of Classification Search
CPC .............. G06F 21/554; H04L 63/1408; H04L 63/1425; H04L 63/1433
See application file for complete search history.

(56) References Cited

U.S. PATENT DOCUMENTS

| | | | | |
|---|---|---|---|---|
| 7,120,933 B2* | 10/2006 | Mattsson | .............. | G06F 21/552 705/405 |
| 8,549,617 B2* | 10/2013 | Wei | ..................... | H04L 63/0272 380/247 |
| 8,826,449 B2* | 9/2014 | Mattsson | ............ | G06F 21/6227 713/165 |
| 2003/0159069 A1* | 8/2003 | Choi | ..................... | G06F 21/552 726/23 |
| 2003/0172264 A1* | 9/2003 | Dillon | ................. | H04L 12/4633 713/160 |
| 2003/0172292 A1* | 9/2003 | Judge | .................... | G06F 21/554 726/23 |
| 2004/0158705 A1* | 8/2004 | Burdett | ............... | H04L 63/0272 713/151 |
| 2007/0074282 A1* | 3/2007 | Black | .................. | H04L 63/0471 726/14 |
| 2010/0265950 A1* | 10/2010 | Foxworthy | .......... | H04L 12/4633 370/392 |
| 2011/0173699 A1* | 7/2011 | Figlin | ................. | H04L 63/1408 726/23 |

OTHER PUBLICATIONS

Tunnel Hunter: Detecting Application-Layer Tunnels with Statistical Fingerprinting; M. Dusi et al.; Computer Networks (COMNET), vol. 53, No. 1, pp. 81-97, Jan. 2009.*
Detecting and Preventing Unauthorized Outbound Traffic; SANS Institute; Brian Wippich; Oct. 15, 2007.*

* cited by examiner

*Primary Examiner* — James Turchen
(74) *Attorney, Agent, or Firm* — Buckley, Maschoff & Talwalkar LLC

(57) ABSTRACT

According to some embodiments, a method and apparatus are provided to receive, at a central security manager located on a computer network, first network information from a first network resource associated with a first network perspective and receive, at the central security manager, second network information from a second network resource associated with a first network perspective. The first network information and the second network information are aggregated. A potential attack to the network is determined and a defensive measure is implemented in response to the potential attack to the network.

19 Claims, 5 Drawing Sheets

| MAC ID 502 | Pattern 504 | User Role 506 | Login Location 508 |
|---|---|---|---|
| 000F01AB0101 | 53 | 50 | 0 |
| 000F01020136 | 19 | 30 | 0 |
| 000F01020101 | 50 | 50 | 50 |
| 000F01420101 | 35 | 75 | 0 |

PROACTIVE SECURITY SYSTEM FOR DISTRIBUTED COMPUTER NETWORKS

BACKGROUND

Computer networks are frequently attacked with a goal of harming the network, illegally obtaining or compromising confidential information, denying service to users, or simply breaching the network. Conventional protective solutions rely on endpoint nodes, such as a firewall, for protecting the network. A firewall controls the outgoing and incoming network connections (e.g., blocks some ports and/or some specific programs) associated with a particular network.

However, firewalls can be "fooled" or spoofed and are often not robust enough to prevent malicious attacks. For example, software running on a client's computer that is internal to a network may still execute malicious actions on the network, even without the client's knowledge. These malicious actions may not be detectible by a firewall. Such malicious software might collect sensitive and client-private data (e.g. bank account login details, credit card details etc.) and send the sensitive data to the attacker.

DETAILED DESCRIPTION

Figure 1:
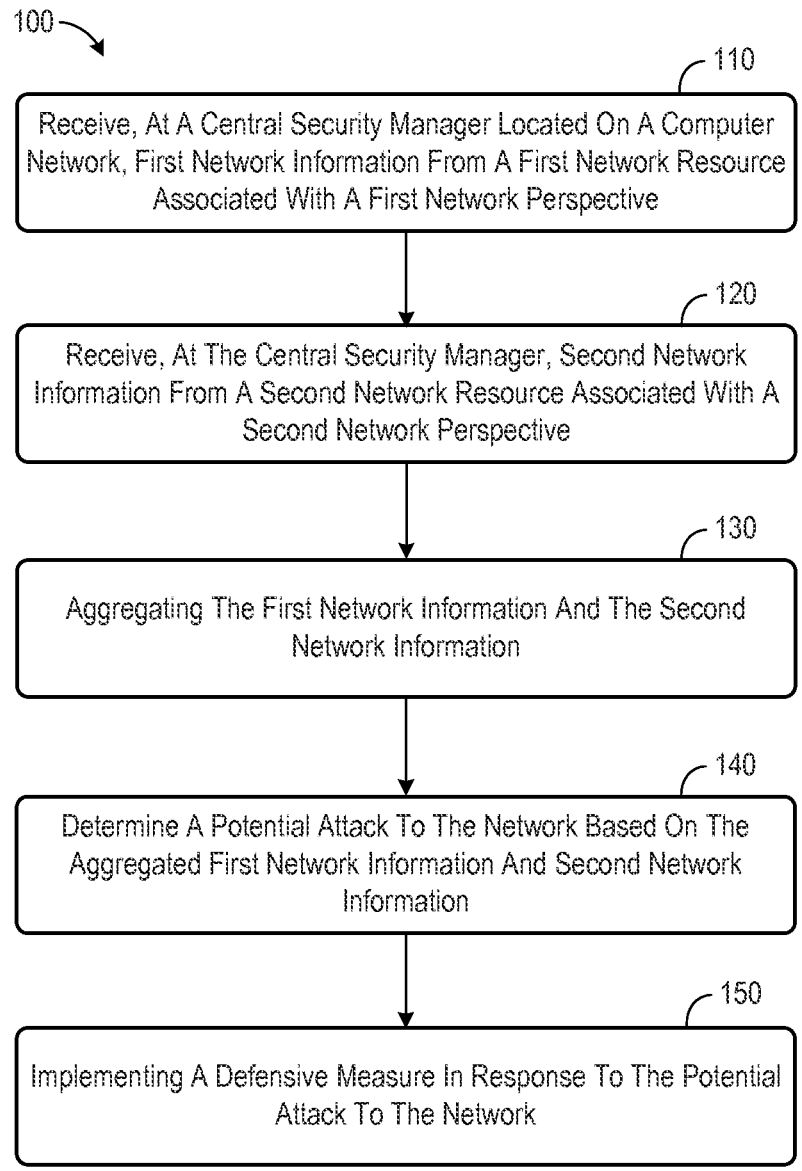
FIG. 1 illustrates a method according to some embodiments.

The present embodiments relate to a method, apparatus and system to identify and defend against malicious network attacks. The present method collects relevant data from various network perspectives and stores the data in a central repository. Network perspectives may comprise different endpoints or middle-points within a computer network. The collected data may be analyzed to better understand network traffic behavior, determine resolutions, provide warnings, and/or proactively act in response to potential malicious behavior. Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4. The method 100 may be associated with a real-time solution to identify and defend against attacks to a computer network by analyzing data in real time, and proactively responding to any determined potential threats or attacks.

At 110, first network information from a first network resource associated with a first network perspective is received at a central security manager located on a computer network. A network resource may comprise, but is not limited to, a router, a switch, a hub, a computer, a client, a server, a client front end, or a server front end. The first information may comprise, but is not limited to, information associated with failed login attempts, information associated with multiple requests for a specific service from a specific user or a group of users, information associated with multiple errors in a log file or from multiple log files where each is associated with a different location (e.g., which might mean a distributed attack on multiple sites in the network), information associated with multiple refresh requests, information associated with suspicious network traffic (e.g., network traffic associated with data patterns that have been associated with viruses and/or malicious worms which can spread through a network), information associated with recurrent/periodical events (e.g., a failed login attempt every day at 13:37, or a configuration change every Saturday at 04:00 AM), information associated with simultaneous events (e.g., a failed login attempt in 5 different locations in the last two minutes and/or 3 different connections were lost in the last minute), information associated with transactions made during suspicious dates/times (e.g., monetary transaction at 03:00 AM), information associated with multiple actions over a short span of time (e.g., a user that logs in, changes a configuration, and logs out within five seconds), information associated with recurrent patterns, information associated with the execution of abnormally large transactions from different locations, information associated with irrationally executing actions from different locations (e.g., a same user logs in from two different locations), information associated with virus-like behaviors in sniffed network data, etc.

Figure 2:
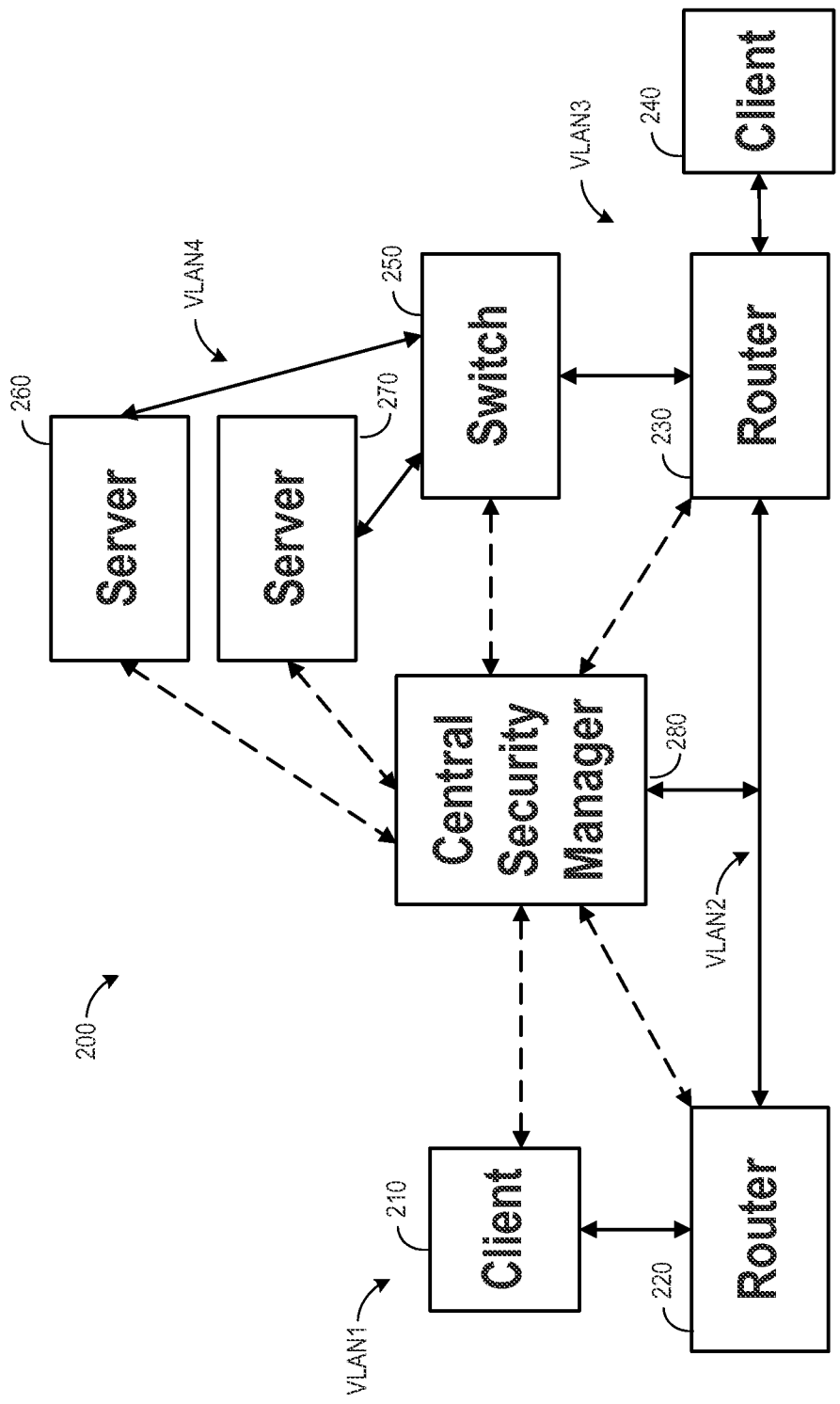
FIG. 2 illustrates a system according to some embodiments.

For illustrative purposes, and to aid in understanding features of the specification, an example will be introduced. This example is not intended to limit the scope of the claims. Now referring to FIG. 2, an embodiment of a computer network 200 is illustrated. The computer network 200 illustrates solid line connections to represent physical connections and dashed line connections to represent logical connections. The computer network 200 comprises clients 210 and 240, routers 220 and 230, servers 260 and 270, a switch 250, and a central security manager 280. The routers 220 and 230 and the switch 250 define a plurality of virtual local area networks ("VLANs") or network segments which are illustrated as VLAN 1, VLAN 2, VLAN 3, and VLAN 4. In the present example, the central security manager may receive first information from the switch 250. The switch 250 may provide first network information from a first network perspective (e.g., a perspective from an endpoint of VLAN 3 and VLAN 4). As illustrated, the central security manager 280 may sit in a heart of a protected system, and thus it's able to provide better insights and predictions compared to e.g. a simple firewall.

Referring back to FIG. 1, at 120, information from a second network resource associated with a second network perspective is received at the central security manager. Continuing with the above example, the central security manager 280 may receive information from router 220. The router 220 may provide second network information from a second network perspective (e.g., a perspective from an endpoint of VLAN 1 and VLAN 2).

Next, at 130, the first network information and the second network information are aggregated. In some embodiments, aggregation may comprise the first network information and the second network information being populated into a database table. However, in other embodiments, aggregation may comprise the combination of log tables or combining like kind results (e.g., summing like kind results). In some embodiments, information may be aggregated in-memory, such as in the memory of a program which runs as the central security manager.

Continuing with the above example, the aggregated first network information and second network information may be combined. For example, the aggregated data may comprise 50 requests from VLAN 1, 25 requests from VLAN 2, and 30 requests from VLAN 4. Thus, the number of requests may total more than 100 requests from three different VLANs for a specific service located on server 260.

At 140, a potential attack to the network may be determined based on the aggregated first network information and second network information. The determining may be performed by a processor such as that described with respect to FIG. 4. In some embodiments, the determining may comprises analyzing the data as a single collection of data. In some embodiments, the determination of a potential attack may be based not only on an amount of suspicious activity but also based on a time span over which the suspicious actions occur. In some embodiments, the central security manager 280 may identify characteristics (e.g., IP address, network domain, operating system, location, etc.) associated with the suspicious activity and thus may be able to distinguish between activity associated with innocent users and activity associated with an attacker.

Determining a potential attack to a computer network may comprise determining patterns (e.g. browsing patterns, login patterns such as locations and dates/times) utilizing an in-memory database in order to provide real time and/or proactive protection to the network. The data used for the determination may be derived by analyzing, in real time, all collected data, such as, but not limited to, log files, sniffed network traffic, and audit events. The determination may also be based on relationships between log entries and network events which facilitate identifying malicious and/or abusive activity in the network. In some embodiments, a single event may not indicate a pattern of malicious activity, but a combination of several events, even legitimate, might together indicate that something malicious is happening on the network.

The central security manager 280 can also be configured to respond to how system users use a specific network (e.g., a use pattern). For example, in one embodiment, the central security manager 280 may learn of the existence of "roles", where each network user has a role in an organization, and each role has access and/or restrictions associated with it. The access and/or restrictions may be associated with a plurality of servers or services according to how a role is defined by an administrator. According to these "roles" the central security manager 280 may base a determination on what is an innocent activity and what is a malicious activity. For example, the central security manager 280 may identify someone who's trying to access a system without having a role at all, or doesn't have the proper access rights in his role. Another advantage of the central security manager 280 is that it doesn't degrade performance of the network nodes it monitors.

Continuing with the above example, more than 100 requests from three different VLANs may cause a determination that a possible distributed denial of service ("DDoS") attack is being launched against server 260.

At 150, a defensive measure is implemented in response to the potential attack to the network. Continuing with the above example, the central security manager 280 may transmit instructions to the routers 220 and 230 and the switch 250 to deny (e.g., do not pass) the requests for the service to the server 260 thus denying malicious users from harming the server 260. In some embodiments, if the central security manager 280 determines potential harmful actions may be imminent, the central security manager 280 may send an instruction to power down a target of the harmful actions (e.g., powering down the server 260).

Other proactive defenses may comprise (i) logging out all users associated with a login ID if the login ID is logged in from two different locations with the same credentials at about the same time (ii) denying access to a login ID for a set time period (e.g., 30 minutes) and/or (iii) requiring a user to enter a CAPTCHA and/or another secret code which only the real user would have known (e.g., by using a SecurID for example). In this fashion, intrusions and/or malicious actions may be reduced (e.g., and may also slow down a DDoS attack). Data related to attacks and defenses may be saved and may therefore be used to predict further actions and to adapt security configurations accordingly. Using saved data, both "innocent" (e.g., a system user) and "malicious" (e.g., an attacker) actions and network traffic patterns may be determined and thus the system may become "smarter" over time, may make better decisions, and may more effectively adjust a network landscape in which it resides.

In some embodiments, the central security manger 280 may further provide warnings, messages, traffic data, combined security logs, and may allow configuration of manual and/or automatic and/or default actions for dealing with malicious actions or traffic. These actions may comprise, for example, blocking a connection, shutting down a server, sending a warning or a notification to an administrator, preventing execution of transactions, preventing configuration changes, and/or preventing duplicated logins (e.g. from multiple locations). The central security manger 280 may send notifications in a form of an email, SMS message, and/or a beeper notification. The central security manger 280 may enforce a policy created by an administrator as well as alert about problematic/malicious activity.

In some embodiments, the central security manager 280 may instruct network nodes, such as, but not limited to, routers and switches, to prevent attackers from accessing a server (such as server 260) while allowing innocent users to continue to use a service on the server, even if the server is under attack. Allowing innocent users to continue to use a service on a server while the server is under attack may also be accomplished by analyzing a use-pattern of each system user and correlating the use-pattern with access logs collected from other servers in the network, such as, for example, servers which a particular innocent user may have previously accessed. The central security manager 280 may be extremely beneficial for security in cloud computing environments, where a servers' protection is crucial since each client might be malicious, and thus analyzing data from multiple locations (e.g., perspectives) in the network (by sitting in the cloud itself) may be a key to successful protection of servers.

In some embodiments, an administrator may define functionality associated with the central security manager 280. For example, the administrator may configure which actions are "innocent" or "malicious" (e.g., the administrator can mark each reported action as innocent or malicious). Furthermore, the administrator may configure both "black lists" and "white lists" of use patterns, and combinations of users' actions which the central security manager 280 can accordingly allow or prevent. In this manner, the central security manager 280 may not block innocent traffic (e.g., non-malicious traffic), or allow malicious traffic to pass. In some embodiments, by configuring use patterns false positives and false negatives may be reduced.

The central security manager 280 and/or the administrator may define some servers and/or services as being more important than others (e.g., having a higher priority of being protected). For example, if a network has a banking transactions server and an administrative server, the central security manager 280 may indicate that the banking transactions server is more important (e.g., has a higher priority to protect) than the administrative server. Accordingly, the central security manager 280 may analyze traffic, logs and other data based on a priority of the server or service to protect. Thus, in some embodiments, higher priority servers or services may be protected prior to lower priority servers or services.

Figure 3:
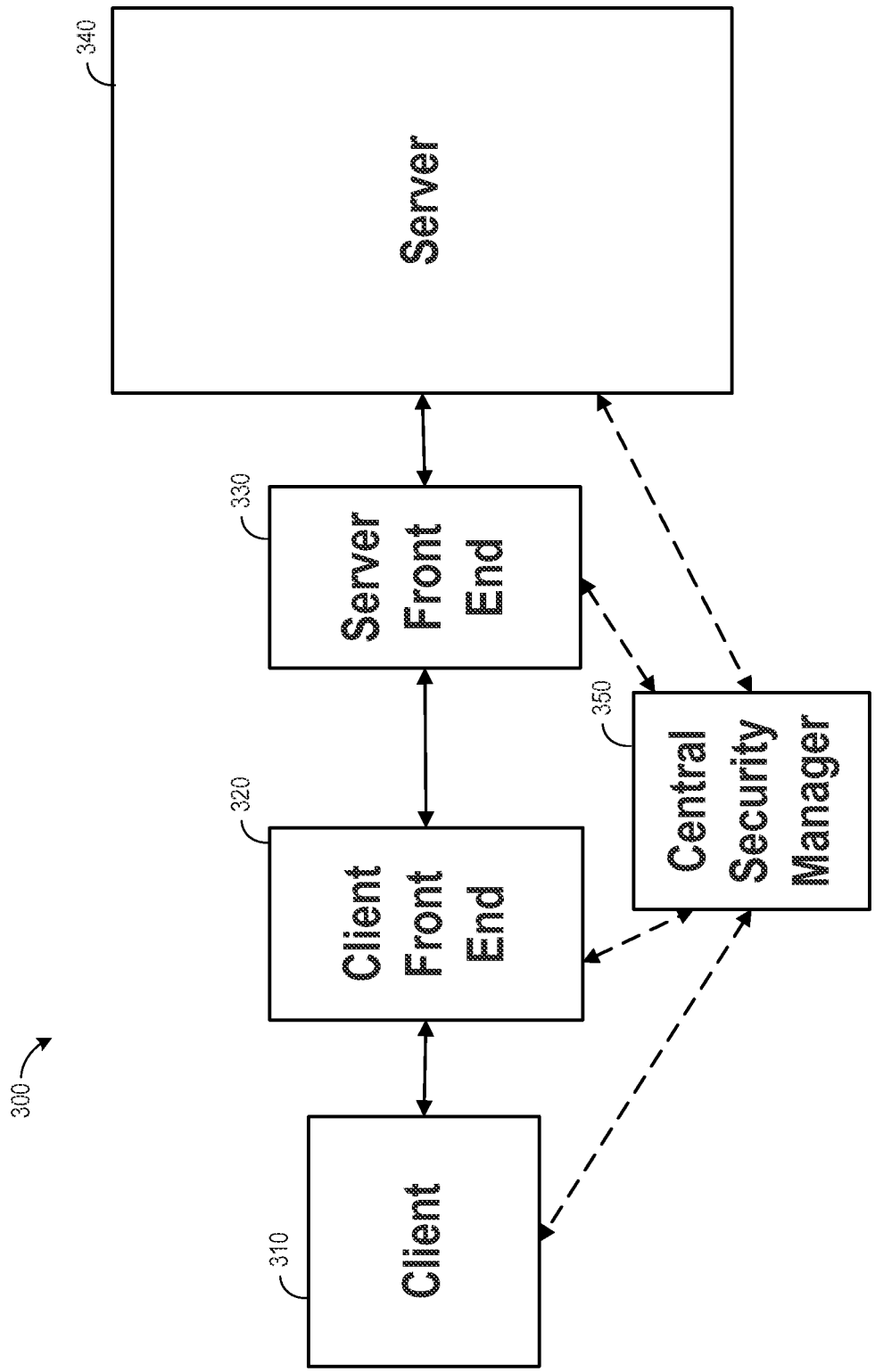
FIG. 3 illustrates a system according to some embodiments.

Now referring to FIG. 3, an embodiment of a computer network 300 is illustrated. The computer network 300 may comprise a client 310, a client front end ("CFE") 320, a server front end ("SFE") 330, a server 340 and a central security manager 350. The CFE 320 may comprise a proxy server or other type of cache entity. The SFE 330 may forward a resource to the CFE 320 where the resource is stored and can later be presented to the client 310.

The central security manager 350 may comprise a repository (e.g., a database) that stores data from multiple SFEs 330 and CFEs 320 that are installed throughout the computer network 300 in order to optimize communications in the network. Instead of accessing the server 340 directly, the client 310 may send a request to the server 340 through the CFE 320 nearest it, which may then pass the request to an SFE 330, which would in turn pass the request to the server 340. Likewise, the server 340 may send back a response to the request through the SFE 330 and through the CFE 320. This concept may be referred to as a SFE-CFE tunnel and the SFE-CFE tunnel may optimize the computer network 300 by compressing the data which flows in the tunnel, caching this data, and minimizing the traffic required in order to pass the data between the CFE and the SFE (data deduplication). Thus, a SFE-CFE tunnel may facilitate quicker responses to clients' requests.

The SFE 330 and the CFE 320 may also generate data, such as, but not limited to, access logs, audit events, security logs, and traffic statistics as well as provide the generated data to the central security manager 350. Moreover, the SFE 330 and the CFE 320 may act as gateways which may filter traffic between clients and thus be able to proactively block connections which the central security manager 350 identifies as malicious and/or suspicious. The central security manager 350 may also act as a proxy for multiple nodes in the network thus being able to block/filter traffic on its own.

Data transmitted between a SFE 330 and a CFE 320 may be accelerated and compressed, and only minimal data (by using a dictionary) may be passed. Therefore, transmitting data between a SFE 330 and a CFE 320 may reduce the bandwidth usage and reduce latency. Furthermore data about traffic behavior (e.g. logs, traffic data, etc.) between a SFE 330 and a CFE 320 may be easily passed to the central security manager 350.

In some embodiments, the processing and analyzing for the central security manager 350 may also occur at (e.g., be distributed to) the SFE 330 and/or CFE 320 themselves. In this manner the SFE 330 and/or CFE 320 may analyze the network traffic that passes through them and this may reduce a load on the central security manager 350. Furthermore, analyzing data by the SFE 330 and/or CFE 320 may provide for quicker responses to detected malicious activities. For example, a SFE 330 and/or CFE 320 may detect a DDoS attack on its own without waiting for processing on a repository associated with a central security manager 350, and thus the SFE 330 and/or CFE 320 can defend against malicious attacks earlier than a central security manager 350. Furthermore, using the SFE 330 and the CFE 320 tunnel may speed up access to logs and data associated with the server 340.

Figure 4:
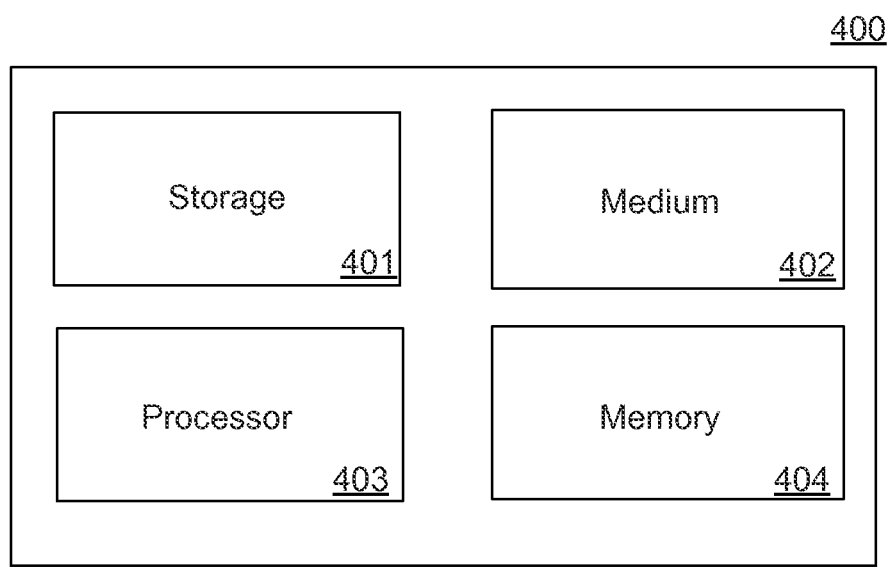
FIG. 4 illustrates an apparatus according to some embodiments.

Now referring to FIG. 4, an embodiment of an apparatus 400 is illustrated. In some embodiments, the apparatus 400 may be associated with a central security manager. In one embodiment, the apparatus 400 may be standalone and may receive data from log files (e.g., security logs) associated with nodes in a computer network (e.g., computers, routers, switches etc.), auditing events collected via nodes associated with the computer network, and sniffing real-time network traffic that flows in the computer network. Furthermore, the apparatus 400 may be implemented as a gateway/proxy server filtering network traffic according to its decisions. In other embodiments, the apparatus 400 may be integrated into an existing protective product in order to enhance its performance, and base its decisions and conclusions on data that the product already supplies in endpoints in the network.

The apparatus 400 may comprise a storage device 401, a medium 402, a processor 403, and a memory 404. According to some embodiments, the apparatus 400 may further comprise a digital display port, such as a port adapted to be coupled to a digital computer monitor, television, portable display screen, or the like.

The medium 402 may comprise any computer-readable medium that may store processor-executable instructions to be executed by the processor 403. For example, the medium 402 may comprise a non-transitory tangible medium such as, but not limited to, a compact disk, a digital video disk, flash memory, optical storage, random access memory, read only memory, or magnetic media.

A program may be stored on the medium 402 in a compressed, uncompiled and/or encrypted format. The program may furthermore include other program elements, such as an operating system, a database management system, and/or device drivers used by the processor 403 to interface with peripheral devices.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The processor 403 communicates with the storage device 401. The storage device 401 may comprise any appropriate information storage device, including combinations of magnetic storage devices (e.g., a hard disk drive), optical storage devices, flash drives, and/or semiconductor memory devices. The storage device 401 stores a program for controlling the processor 403. The processor 403 performs instructions of the program, and thereby operates in accordance with any of the embodiments described herein. For example, the processor 403 may determine a potential attack.

The main memory 404 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 404 may comprise a plurality of memory modules.

As used herein, information may be "received" by or "transmitted" to, for example: (i) the apparatus 400 from another device; or (ii) a software application or module within the apparatus 400 from another software application, module, or any other source.

In some embodiments, the storage device 401 stores a database (e.g., including information associated with malicious network activity). Note that the database described herein is only an example, and additional and/or different information may be stored therein. Moreover, various databases might be split or combined in accordance with any of the embodiments described herein.

Figure 5:
FIG. 5 illustrates a portion of a database according to some embodiments.

Now referring to FIG. 5, a table is shown that represents a database 500 that may be stored locally at the apparatus 400 according to some embodiments. The table may include, for example, entries relating to specific network behavior patterns. The table may also define fields 502, 504, 506, and 508 for each of the entries. The fields 502, 504, 506, and 508 may, according to some embodiments, specify: a medium access control ID 502 of a device reporting potential malicious activity, patterns 504, user roles 506, and login locations 508.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
   receiving, at a central security manager located on a computer network, first network information from a first network resource associated with a first network perspective via a first server front end ("SFE") to client front end ("CFE") tunnel that accelerates transmission of the first network information;
   receiving, at the central security manager, second network information from a second network resource associated with a second network perspective via a second SFE to CFE tunnel that accelerates transmission of the second network information;
   aggregating the first network information and the second network information;
   transmitting, via a processor, information regarding a first suspicious connection to the first SFE to CFE tunnel, the information based on the aggregated first network information and second information;
   analyzing, at the first SFE to CFE tunnel, network traffic that passes through the first SFE to CFE tunnel to determine a second suspicious connection;
   blocking the first suspicious connection and the second suspicious connection at the first SFE to CFE tunnel; and
   wherein the first SFE to CFE tunnel generates access logs, audit events, security logs, and traffic statistics and provides the generated data to the central security manager.

2. The method of claim 1, wherein the first network perspective is from a first network segment of the computer network and the second network perspective is from a second network segment of the computer network and wherein the first network segment is different than the second network segment.

3. The method of claim 1, wherein the determining is further based on known patterns of network attacks.

4. The method of claim 1, wherein the determining is further based on user roles.

5. The method of claim 1, wherein blocking comprises turning off a server.

6. The method of claim 1, wherein the first SFE to CFE tunnel includes a CFE that comprises a cache entity.

7. The method of claim 6, wherein the CFE that comprises the cache entity transmits a request from a client to a SFE and the SFE transmits the request to the central security manager.

8. The method of claim 1, wherein the first SFE to CFE tunnel compresses data transmitted via the SFE to CFE tunnel and caches the data transmitted via the SFE to CFE tunnel.

9. The method of claim 1, wherein the first SFE to CFE tunnel blocks connections identified as malicious and/or suspicious by the central security manager.

10. A non-transitory computer-readable medium comprising instructions that when executed by a processor perform a method, the method comprising:
    receiving, at a central security manager located on a computer network, first network information from a first network resource associated with a first network perspective via a first server front end ("SFE") to client front end ("CFE") tunnel that accelerates transmission of the first network information;
    receiving, at the central security manager, second network information from a second network resource associated with a second network perspective via a second SFE to CFE tunnel that accelerates transmission of the second network information;
    aggregating the first network information and the second network information; transmitting, via a processor, information regarding a first suspicious connection to the first SFE to CFE tunnel, the information based on the aggregated first network information and second information;
    analyzing, at the first SFE to CFE tunnel, network traffic that passes through the first SFE to CFE tunnel to determine a second suspicious connection;
    blocking the first suspicious connection and the second suspicious connection at the first SFE to CFE tunnel; and
    wherein the first SFE to CFE tunnel generates data access logs, audit events, security logs, and traffic statistics and provides the generated data to the central security manager.

11. The medium of claim 10, wherein the determining is further based on known patterns of network attacks.

12. The medium of claim 10, wherein the method further comprises:
    when the first suspicious connection or the second suspicious connection is determined to be an actual attack, saving information associated with the attack.

13. The medium of claim 10, wherein blocking comprises turning off a server.

14. The medium of claim 10, wherein blocking comprises eliminating access to one or more clients.

15. An apparatus comprising:
    a processor; and
    a non-transitory computer-readable medium comprising instructions that when executed by a processor perform a method, the method comprising:
    receiving, at a central security manager located on a computer network, first network information from a first network resource associated with a first network perspective via a first server front end ("SFE") to client front end ("CFE") tunnel that accelerates transmission of the first network information;
    receiving, at the central security manager, second network information from a second network resource associated with a second network perspective via a second SFE to CFE tunnel that accelerates transmission of the second network information; aggregating the first network information and the second network information; transmitting, via the processor, information regarding a first suspicious connection to the first SFE to CFE tunnel, the information based on the aggregated first network information and second information;
    analyzing, at the first SFE to CFE tunnel, network traffic that passes through the first SFE to CFE tunnel to determine a second suspicious connection;
    blocking the first suspicious connection and the second suspicious connection at the first SFE to CFE tunnel; and
    wherein the first SFE to CFE tunnel generates data access logs, audit events, security logs, and traffic statistics and provides the generated data to the central security manager.

16. The apparatus of claim 15, wherein the determining is further based on known patterns of network attacks.

17. The apparatus of claim 15, when a potential threat is determined to be an actual attack, saving a pattern associated with the attack.

18. The apparatus of claim 15, wherein blocking comprises turning off a server.

19. The apparatus of claim 15, wherein blocking comprises eliminating access to one or more clients.

* * * * *